United States Patent [19]
Hansen

[11] Patent Number: 6,000,808
[45] Date of Patent: Dec. 14, 1999

[54] OPTIONALLY LIGHTED FISHING POLE

[76] Inventor: Jeffrey T. Hansen, 29W554 Country Rd., Warrenville, Ill. 60555

[21] Appl. No.: 08/991,874

[22] Filed: Dec. 16, 1997

[51] Int. Cl.[6] .................................................. F21V 33/00
[52] U.S. Cl. ........................ 362/109; 362/551; 362/582; 362/577; 362/583; 43/17.5
[58] Field of Search .................................. 362/109, 577, 362/102, 293, 551, 582, 583; 43/17.5

[56] References Cited

U.S. PATENT DOCUMENTS

| | | | |
|---|---|---|---|
| 4,085,437 | 4/1978 | Hrdlicka et al. | 362/109 |
| 4,369,486 | 1/1983 | Pool | 362/577 |
| 4,775,920 | 10/1988 | Seibert et al. | 362/577 |
| 5,357,410 | 10/1994 | Cota et al. | 362/109 |
| 5,400,225 | 3/1995 | Currie | 362/583 |
| 5,738,433 | 4/1998 | Sparks | 362/109 |

Primary Examiner—Thomas M. Sember
Attorney, Agent, or Firm—Charles F. Lind

[57] ABSTRACT

The disclosed optionally lighted fishing pole has a portable source of light held relative to the pole proximate its handle, with a operable on-off switch. A continuous light-transmitting element is extended axially along the pole body from the handle toward the pole tip. The light source has reflective and lens structures directing light axially into the light-transmitting element proximate the handle for transmission along the length of the element and illumination of the exterior circumferential surface of the element. The illuminated exterior circumferential surface of the lighted light-transmitting element is visible from lateral proximity of the fishing pole, for improved fishing during darkness. The light-transmitting element can be mounted externally of the pole body, or internally of a hollow pole body that is also formed of transparent or translucent material.

6 Claims, 1 Drawing Sheet

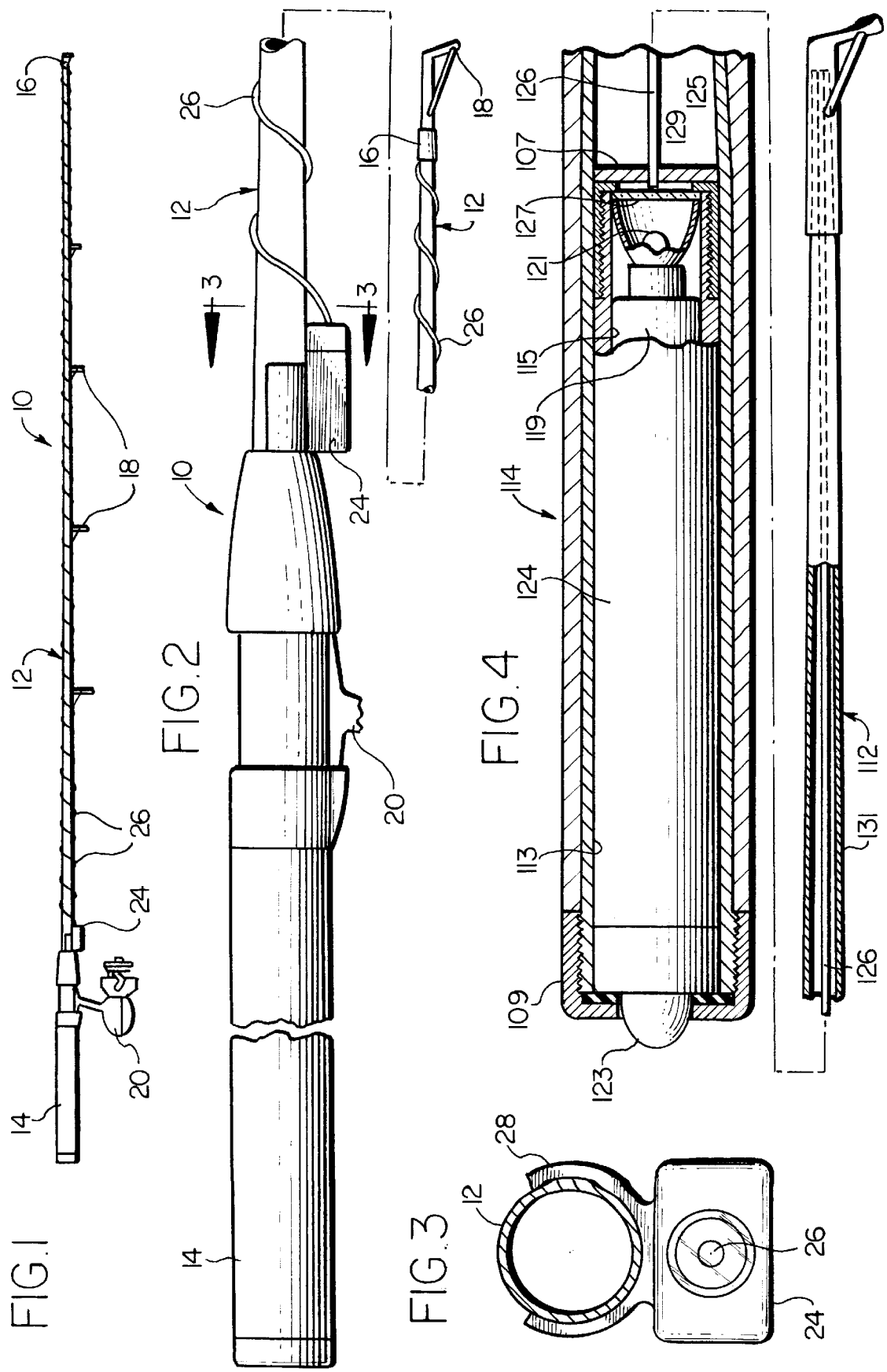

OPTIONALLY LIGHTED FISHING POLE

BACKGROUND OF THE INVENTION

Recreational sport fishing is now being enjoyed by millions throughout the world, with equipment frequently including a fishing pole or rod, and a hook, line and sinker, etc. manipulated by the pole. However, fishing with such equipment at night can present a challenge, since the available light might be inadequate to provide pole visibility, possibly allowing then the pole to be damaged by accidentally sitting or standing on it, or the pole to be moved to strike and damage or injure nearby things or people.

Several different approaches have been used in an effort to overcome or compensate for this lack of pole visibility, including accessories mounted on the pole at selected locations and operated when activated to yield either an audible or visual signal. Thus, a bell can be clipped onto the pole to audibly sound upon pole movement for yielding some indications of its location; however a bell yields no signal when the pole is stationary. Also, phosphorescent module accessories containing reactive chemicals can be activated by mixing the chemicals and then clipped onto a fishing pole where appropriate, to yield a visual signal, but such benefits are short lived, quite local and expensive.

SUMMARY OF THE INVENTION

This invention relates to and an object of this invention is to provide an improved fishing pole or rod having structure thereon for optionally illumination of the pole or rod to make it visible for more effective night fishing.

A more detailed object of the invention is to provide structure along or at intermediate locations along the pole length (such as continuously or at or between the line eyelets or at the pole tip), and illuminating the structure for making the pole more visible for night fishing.

An important feature of the invention is the use of an elongated light-transmitting element extended from a portable source of light near the pole handle and along the length of the pole to any intermediate location or out to the pole tip, or where pole illumination is desired.

The light-transmitting element can be a continuous thin strand of a fiber-optic or an acrylic element, secured to the exterior of the pole body along its length, as by winding it as a helix around the body, where the pole body can be of any material; or the light-transmitting element can be contained within the pole body should it be formed of a hollow translucent material.

The portable light source can be a flash light, modified to the extent to be mounted to the pole adjacent the pole handle or made as part of or within a hollowed pole handle, and to provide a light output therefrom focused directly into the input exposed end of the adjacent light-transmitting element.

BRIEF DESCRIPTION OF THE DRAWINGS

These and other objects, features or advantages of the invention will be more fully understood and appreciated after a review of the disclosure of the invention which includes as a part thereof the accompanying drawings, wherein:

FIG. 1 is an elevational view of a typical fishing pole for which the subject invention will advantageously be used;

FIG. 2 is an enlarged sectional view of the handle and tip ends of the fishing pole having a first embodiment of the invention incorporated therein;

FIG. 3 is a sectional view as taken generally from line 3—3 in FIG. 2; and

FIG. 4 is an enlarged sectional view of the handle and tip ends of the fishing pole having a second embodiment of the invention incorporated therein.

DETAILED DESCRIPTION OF PREFERRED EMBODIMENTS OF THE INVENTION

A generally conventional fishing pole or rod 10 is illustrated in FIG. 1, having an elongated body 12 with a handle 14 and tip 16 at its opposite ends. Eyelets 18 are provided along the pole length, at spaced intervals between the pole handle 14 and pole tip 16, and a reel 20 mounted on the pole body near the handle provides a retractable supply of fishing line (not shown) guided by the eyelets and extended along the pole to and beyond the pole tip.

The pole body 12 typically will be formed of a structural but flexible material, such as wood, metal alloy or a synthetic such as fiber glass, graphite, or a combination of such materials, and will be both opaque to light and will not transmit light.

With such a pole body construction, one embodiment of the invention would be to mount a portable light source 24 to the pole near the pole handle, and to extend a light-transmitting 26 element from the light source along the pole body 12 to any intermediate location or continuously out to the pole tip 16, or to where pole illumination might be desired.

The light-transmitting element 26 can conveniently be helically wound around the exterior surface of the pole body 12, making it stably contained on the pole and having parts of it exposed and visible from any side of the pole body and axially along the pole body. Adhesive can be used to secure the pole body and light-transmitting element together, along the entire length of the element or only at spaced local places along the length.

The light source 24 can have the same components of a conventional battery powered flash light and it can be held by clamp 28 in place on the pole, the light source being modified to the extent to hold the light-transmitting element 26 and to focus its output light as a narrow beam axially into an exposed end of the element 26. Light would then be transmitted away from the light source along the light-transmitting element toward the tip 16.

The light-transmitting element 26 can be of a conventional fiber-optic element having a central core and a surrounding clad, although the clad might preferably be lightly abraded to allow radial escape of the transmitted light in the core to the circumferential exterior surface of the element. A plastic material light-transmitting element might be preferred over a glass element, for greater flexibility to withstand flexure strains associated with the fishing pole during its use. The light-transmitting element 26 might also be an acrylic rod or strand, without any outer cladding, as is very effective in transmitting light axially along its length and in having the light illuminate its circumferential surface; and might even be preferred even a fiber-optic element. An acrylic rod element might be of the order between 1/32" and 1/8" diameter. It might be preferred further to coat or bond the opposite otherwise exposed tip end of the element 26 with light reflective material (not shown but perhaps opaque reflective paint), so that transmitted light is not allowed to be axially released from the pole tip, but is contained within the element and released only to the exterior circumferential element surface, to illuminate the element surface along the element length or where desired.

The basic operation of the fishing pole 10 can be readily understood and appreciated, as light source 24 can be optionally operated to illuminate the light-transmitting element 26 and provide a glowing exterior circumferential element surface, which will be visible to anyone laterally nearby. The illuminated exterior surface of the light-transmitting element 26 will provide a visual indication of the pole location even in the otherwise night time darkness. This can add to the pleasure of night time fishing, and the potential for avoiding accidental pole damage, or damage or injury to nearby things or people because of the inability to see the pole in the darkness. Further, the pole user could wave the illuminated pole to alert an approaching boat of his/her presence, for decreasing the possibility of an accidental boat collision. The illuminated pole angled out and over the water surface could also be an attraction to nearby fish, for potentially increasing the catch.

Of interest, virtually any commercially available make or model fishing pole can be converted to operate as the optionally lighted fishing pole 10. This would include allowing a fishing pole owner to complete an after-market conversion with all necessary operating components provided in an accessory kit, for example. A commercial manufacturer could also make an optionally lighted fishing poles in the same manner disclosed, but modified forms of the invention illustrated in FIG. 4 might be even better suited.

For example, a fishing pole typically is made by joining separate handle and pole body components together, so that an optionally illuminated fishing pole might be commercially make by using specialized handle and/or pole body components.

Handle 114 is one example having a tubular case 111 with an open bottom end and cross wall 113, and light source 124 can be inserted into and contained within the hollow handle between the cross wall 107 and a closure cap 109 threaded across the open end. The light source 124 can be a modified flash light, having a case 115 for holding battery 119, light bulb 121, on-off switch 123, reflector means 125 and lens 127, for producing and focusing output light as a narrow axial beam. On-off switch 123 can be shaped to protrude or be accessible through an opening in closure cap 109 to be operated easily by thumb depression. Light-transmitting element 126 can be held by the cross wall 107 to have the exposed element end 129 axially aligned with the narrow output beam from the light source 124, and can be extended away from the handle to cooperate with the pole body. This handle structure encloses the light source 124, to be out of sight, mind, the way, etc.

The pole body 112 might also be of a hollow cross-section, due to it being manufactured by helically wrapping a fiber glass strip or the like initially over a support rod (not shown) and then over the first and subsequently wound underlying strip layer(s), and of removing the rod after the fiber glass strip or layers harden, leaving axially extended annular body wall 131. Should the component fiber glass strips be transparent or translucent, suited to be illuminated and/or to transmit light over several inches, the light-transmitting element 126 can be routed axially along the pole length out to the end tip 16 and/or tip eyelet 18, while being contained within the hollow pole body 131; again being out of sight, mind, the way, etc. Nonetheless, operation of light source 124 and the resultant illumination of the light-transmitting element 126 and its glowing exterior surface, via light transmission through the pole body wall, will provide an illuminated pole body exterior circumferential surface for visually indicating pole location, for enjoyable and safe pole use even in the night time darkness.

The above disclosed structures and features can be used in different combinations to form varied types of optionally illuminated fishing poles. The pole body wall 131 can be extended into the handle and be bonded or otherwise united to and in axial alignment with the handle wall 113, to have the light-transmitting element 124 totally contained within the tubular wall structures. Alternatively, light-transmitting element can be extended through an opening (not shown) in the handle 114 to reach the exterior circumferential surface of the pole body 112 (as shown in FIGS. 1 and 2), to then be axially extended away from the handle along the length of the pole body as needed, to provide an optionally illuminated pole (not shown) with an exterior light-transmitting element and a handle contained light source.

The eyelets 18 or local portions of the pole body itself at axially spaced surface locations between line reel 20 and tip eyelet 18, on its inside and/or outside surface, can be coated with a translucent, light-transmitting, phosphorescent or luminescent material, to be illuminated also then by the light-transmitting element passing in contact or close proximity therewith, enhancing the visibility of the pole. Different lens 127 can be made available, in different colors, to allow selective use of any one of the lens and have the light from the illuminated light-transmitting element take on the color of the lens; making lighted poles of different colors to be readily distinguished even in the darkness.

The entire electrical power and control structures of the light source and of the light-transmitting element can be made waterproof, for reliable operation during its use proximate the fishing waters.

While specific embodiments have been illustrated, it will be obvious that minor changes could be made therefrom without departing from the spirit of the invention. Accordingly, the invention is to be determined by the scope of the following claims.

What is claimed is:

1. An optionally lighted fishing pole, comprising the combination of an elongated flexible pole body having a pole handle and a pole tip near opposite ends thereof, a portable source of light, means holding said source of light relative to the pole proximate said handle, and means to activate and deactivate such light source, a continuous flexible light-transmitting element extended axially along the pole body away from the handle and toward the tip and having an exterior circumferential surface, said light-transmitting element being stably mounted on the pole to be flexed therewith and being comprised of translucent acrylic operable for directing light both axially and radially of such element, means including a replaceable lens for directing light from said activated light source axially into the light-transmitting element proximate the handle for transmission axially along the length of the element and for illumination of the entire exterior surface of the element and different lenses being available in different colors and selectively used individually to correspondingly color the light transmission to the light-transmitting element and the exterior appearance of the lighted pole, and providing that the illuminated exterior circumferential surface of the lighted light-transmitting element as extended axially along the pole body is visible from close lateral exterior proximity of the fishing pole.

2. A lighted fishing pole according to claim 1, further wherein the visibility of the illuminated exterior circumferential surface of the lighted light-transmitting element is comprised by said light-transmitting element being on the exterior of the pole body and visible directly.

3. A lighted fishing pole according to claim 2, further comprising the light-transmitting element running helically around the pole body exterior to offer visibility from any side of the pole.

4. A lighted fishing pole according to claim 1, further wherein the visibility of the illuminated exterior circumferential surface of the lighted light-transmitting element is comprised by the pole body being hollow and of translucent material, and said light-transmitting element being contained within an annular wall of the pole body making light visibility through the annular wall of the pole body.

5. A lighted fishing pole according to claim 1, further comprising the light-transmitting element being continuously extended between the means for directing light from said activated light source at the pole handle and the pole tip, and reflective means on said light-transmitting element at said pole tip operable for axially containing the transmitted light within the element.

6. A lighted fishing pole according to claim 1, further wherein the means holding said light source relative to the pole proximate said handle comprising the handle being hollow and the light source being contained within the handle.

* * * * *